(12) United States Patent
Sekine

(10) Patent No.: US 10,830,120 B2
(45) Date of Patent: Nov. 10, 2020

(54) HEATING SYSTEM

(71) Applicant: Robert Bosch GmbH, Stuttgart (DE)

(72) Inventor: Osami Sekine, Saitama (JP)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 16/451,083

(22) Filed: Jun. 25, 2019

(65) Prior Publication Data

US 2020/0003102 A1 Jan. 2, 2020

(30) Foreign Application Priority Data

Jun. 28, 2018 (JP) ................. 2018-123760

(51) Int. Cl.
*F01N 3/10* (2006.01)
*F01N 3/28* (2006.01)
*H05B 1/02* (2006.01)
*F01N 3/20* (2006.01)

(52) U.S. Cl.
CPC .......... *F01N 3/2896* (2013.01); *F01N 3/208* (2013.01); *H05B 1/0297* (2013.01)

(58) Field of Classification Search
CPC ...... F01N 3/2896; F01N 3/2066; F01N 3/208; H05B 1/0297
USPC .......................................... 60/300
See application file for complete search history.

(56) References Cited

U.S. PATENT DOCUMENTS

| 2004/0112046 A1* | 6/2004 | Tumati | F01N 13/009 60/297 |
|---|---|---|---|
| 2008/0300774 A1* | 12/2008 | Wakahara | F02D 35/025 701/113 |
| 2010/0242439 A1* | 9/2010 | Domon | B01D 53/9431 60/274 |
| 2012/0318214 A1* | 12/2012 | Iwai | F02D 41/064 123/41.15 |
| 2013/0118155 A1* | 5/2013 | Domon | F01N 3/10 60/274 |
| 2015/0094877 A1* | 4/2015 | Tahnoose | G07C 5/008 701/1 |
| 2016/0076424 A1* | 3/2016 | Taekhoon | F01N 3/2066 60/274 |
| 2016/0258343 A1* | 9/2016 | Mushiga | F01P 7/164 |
| 2017/0321582 A1* | 11/2017 | Nakao | B01D 53/90 |
| 2017/0370263 A1* | 12/2017 | Heichelbech | F01N 3/2066 |

(Continued)

FOREIGN PATENT DOCUMENTS

JP 2018071362 5/2018

*Primary Examiner* — Jason D Shanske
(74) *Attorney, Agent, or Firm* — Michael Best & Friedrich LLP

(57) ABSTRACT

A heating system that heats the reducing agent supplier for supplying an urea aqueous solution to an exhaust passage of the internal combustion engine in a vehicle includes: a block heater that is provided in a housing formed with a coolant circuit of the internal combustion engine and can be supplied with power of an external power supply; a coolant circulation passage that is branched from the coolant circuit, is disposed in at least a part of the reducing agent supplier, and merges with the coolant circuit again; an on-off control valve that is provided in the middle of the coolant circulation passage; a bypass passage that connects an upstream side and a downstream side of the on-off control valve; and an on-off valve that is provided in the bypass passage.

6 Claims, 3 Drawing Sheets

(56) References Cited

U.S. PATENT DOCUMENTS

| | | | |
|---|---|---|---|
| 2018/0119597 A1* | 5/2018 | Styron | F01P 7/167 |
| 2018/0187585 A1* | 7/2018 | Crawford | H05B 6/06 |
| 2018/0266349 A1* | 9/2018 | Almkvist | B60W 30/194 |
| 2018/0266637 A1* | 9/2018 | Curlett | F21L 4/02 |
| 2018/0347493 A1* | 12/2018 | Tascillo | F02D 41/1401 |
| 2019/0178174 A1* | 6/2019 | Beckmann | F02D 41/0002 |
| 2019/0271247 A1* | 9/2019 | Minezawa | F01N 3/08 |

\* cited by examiner

HEATING SYSTEM

BACKGROUND OF THE INVENTION

The present invention relates to a heating system that heats a reducing agent supplier for supplying a urea aqueous solution to an exhaust passage of an internal combustion engine in a vehicle.

Exhaust gas of an internal combustion engine such as a diesel engine mounted on a vehicle contains NOx (nitrogen oxides). As a device that reduces such NOx by decomposing NOx into nitrogen, water, and the like and thereby purifying the exhaust gas, a urea selective catalytic reduction (SCR) system has been in practical use. The urea SCR system is a system that uses a urea aqueous solution as a liquefied reducing agent and decomposes NOx by causing ammonia, which is produced when the urea aqueous solution is decomposed, to react with NOx in the exhaust gas.

Such a urea SCR system includes: a selective reduction catalyst disposed in an exhaust passage; and a reducing agent supplier for supplying the urea aqueous solution to a portion of the exhaust passage on an upstream side of the selective reduction catalyst. The selective reduction catalyst has a function of adsorbing ammonia, which is produced when the urea aqueous solution is decomposed, and promoting a reduction reaction of NOx in the inflow exhaust gas with ammonia. The reducing agent supplier includes: a pump that pressure-feeds the urea aqueous solution stored in a storage tank; and an injection valve that injects the urea aqueous solution pressure-fed by the pump.

A freezing point of the urea aqueous solution used in the urea SCR system differs by concentration thereof. The lowest freezing point is approximately 11° C. below zero. Thus, in order to prevent damage to the pump, the injection valve, further piping through which the urea aqueous solution flows, and the like, which is caused by expansion of a volume of the frozen urea aqueous solution during a stop of the vehicle, the urea aqueous solution is collected into the storage tank from the reducing agent supplier when the internal combustion engine is stopped. At a start of the internal combustion engine, the reducing agent supplier is filled with the urea aqueous solution again.

Here, in the case where the urea aqueous solution in the storage tank is frozen during the stop of the vehicle, the urea aqueous solution cannot be delivered into the reducing agent supplier. To handle such a problem, a system that causes a coolant for the internal combustion engine to circulate in the reducing agent supplier and heats the reducing agent supplier so as to defrost the urea aqueous solution has been available (for example, see JP-A-2018-71362). According to such a system, defrosting of the urea aqueous solution is promoted by the coolant whose temperature is gradually increased by starting of the internal combustion engine. As a result, a period before injection of the urea aqueous solution is resumed is shortened.

SUMMARY OF THE INVENTION

However, in the case where the internal combustion engine is started after the vehicle is stopped for a long period under extremely low temperature environment such as in a cold region, it takes a long time to defrost the urea aqueous solution despite a fact that the coolant for the internal combustion engine is circulated into the reducing agent supplier. In this case, purification efficiency of NOx in the exhaust gas remains low until the injection of the urea aqueous solution is started. As a result, exhaust emission possibly worsens.

The present invention has been made in view of the above problem and therefore has a purpose of providing a heating system for a reducing agent supplier capable of causing a coolant for an internal combustion engine to circulate in the reducing agent supplier before a start of the internal combustion engine.

In order to solve the above problem, according to an aspect of the present invention, a heating system that heats a reducing agent supplier for supplying an urea aqueous solution to an exhaust passage of an internal combustion engine in a vehicle is provided. The heating system includes: a block heater that is provided in a housing formed with a coolant circuit of the internal combustion engine and can be supplied with power of an external power supply; a coolant circulation passage that is branched from the coolant circuit, is disposed in at least a part of the reducing agent supplier, and merges with the coolant circuit again; an on-off control valve that is provided in the middle of the coolant circulation passage; a bypass passage that connects an upstream side and a downstream side of the on-off control valve; and an on-off valve that is provided in the bypass passage.

As it has been described so far, according to the present invention, the coolant for the internal combustion engine can circulate in the reducing agent supplier before a start of the internal combustion engine. Therefore, the urea aqueous solution can start being supplied shortly after the start of the internal combustion engine.

DETAILED DESCRIPTION

A detailed description will hereinafter be made on a preferred embodiment of the present invention with reference to the accompanying drawings. Note that, in the present specification and the drawings, components that have substantially the same functional configurations will be denoted by the same reference signs, and thus a description thereof will not be repeated.

1. Overall Configuration of Urea SCR System

Figure 1:
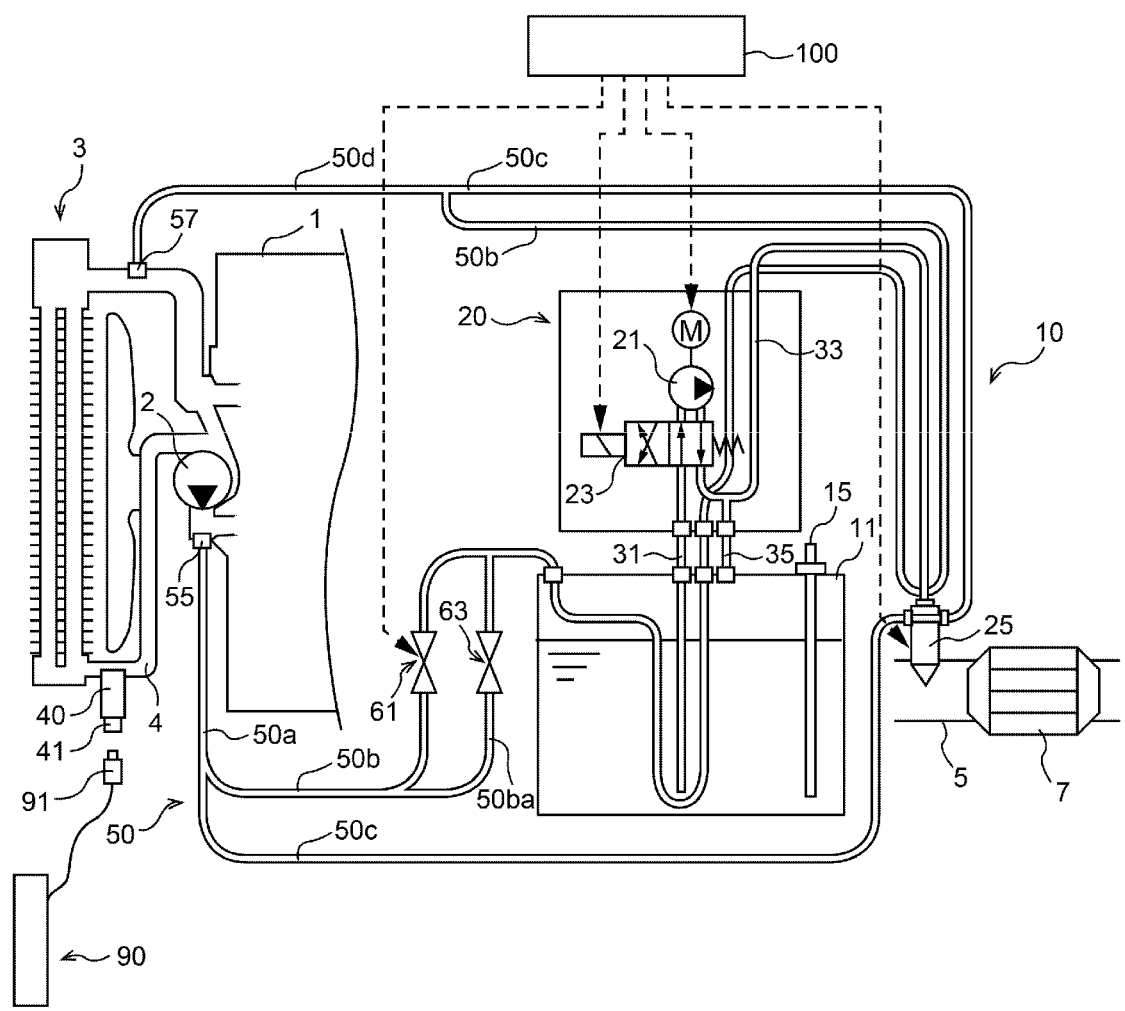
FIG. 1 is a schematic view of a reducing agent supplier to which a heating system according to an embodiment of the present invention can be applied.

First, a description will be made on an example of an overall configuration of a urea SCR system including a reducing agent supplier to which a heating system according to this embodiment can be applied. FIG. 1 is a schematic view of a configuration example of the urea SCR system.

The urea SCR system includes: a selective reduction catalyst 7 that is disposed in the middle of an exhaust pipe 5 connected to an exhaust system of an internal combustion engine 1 represented by a diesel engine or the like; and a reducing agent supplier 10 that injects a urea aqueous solution into a portion of the exhaust pipe 5 on an upstream side of the selective reduction catalyst 7. The urea SCR system is a system that is mounted on a vehicle such as an automobile, uses the urea aqueous solution to reduce NOx in exhaust gas discharged from the internal combustion engine 1, and thereby purifies the exhaust gas, for example. As the urea aqueous solution, a urea aqueous solution whose concentration is approximately 32.5% and whose freezing point is the lowest is used, for example. In this case, the freezing point is approximately 11° C. below zero.

The selective reduction catalyst 7 has a function of selectively reducing NOx contained in the exhaust gas of the internal combustion engine 1. For example, the selective reduction catalyst 7 adsorbs ammonia that is produced when the urea aqueous solution supplied by the reducing agent supplier 10 is decomposed. Then, NOx in the exhaust gas flowing into the selective reduction catalyst 7 is decomposed by a reduction reaction with ammonia. Such a selective reduction catalyst 7 has characteristics that NOx reduction efficiency is increased in a state where a temperature thereof exceeds an activation temperature and that an ammonia adsorbable amount is reduced with a temperature increase. The selective reduction catalyst 7 also has a characteristic that the NOx reduction efficiency is increased as an actual ammonia adsorption rate with respect to the adsorbable amount is increased.

The reducing agent supplier 10 supplies the urea aqueous solution into the portion of the exhaust pipe 5 on the upstream side of the selective reduction catalyst 7. A supply amount of the urea aqueous solution is controlled by a controller 100 on the basis of the concentration of NOx contained in the exhaust gas, the ammonia adsorbable amount of the selective reduction catalyst 7, and the like such that neither NOx nor ammonia flows into a downstream side of the selective reduction catalyst 7.

In addition to these, the exhaust pipe 5 may be provided with various sensors including a temperature sensor, a NOx sensor, an ammonia sensor, and the like, which are not illustrated. Each of these sensors is used to detect an exhaust temperature, the NOx concentration, ammonia concentration, or the like. The exhaust temperature that is detected by the temperature sensor may be used to estimate the temperature of the selective reduction catalyst 7.

2. Reducing Agent Supplier

Next, a detailed description will be made on an example of a configuration of the reducing agent supplier 10 according to this embodiment. The reducing agent supplier 10 includes: a storage tank 11 that stores the urea aqueous solution; a pump unit 20 that has a pump 21 for pressure-feeding the urea aqueous solution; and an injection valve 25 that is fixed to the portion of the exhaust pipe 5 on the upstream side of the selective reduction catalyst 7. The pump 21 and the injection valve 25 are subjected to drive control by the controller 100 that is configured to include a microcomputer and the like.

The storage tank 11 is provided with a temperature sensor 15 that detects a temperature of the urea aqueous solution. The pump unit 20 includes the pump 21 and a channel selector valve 23. The pump 21 is connected to the storage tank 11, which stores the urea aqueous solution, via a first supply passage 31. The pump 21 is also connected to the injection valve 25 via a second supply passage 33. A return passage 35, one end of which is connected to the storage tank 11, is connected to the second supply passage 33. The return passage 35 may be provided with at least one of an orifice and a check valve, which are not illustrated. The orifice or the check valve has a function of keeping a pressure in the second supply passage 33.

As the injection valve 25, an electromagnetic on-off valve that is switched between opening and closing by energization control is used, for example. Such an injection valve 25 includes a coil, and is structured to be opened when a magnetic force, which is generated by energizing the coil, moves a valve body. The controller 100 adjusts a valve opening period of the injection valve 25 in accordance with a target injection amount of the urea aqueous solution while controlling output of the pump 21 such that the pressure in the second supply passage 33 obtains a specified target value.

The injection valve 25 may be attached to a main stream portion of the exhaust pipe 5, through which the exhaust gas flows, as illustrated in FIG. 1, or may be attached to a branch portion that merges with the main stream portion of the exhaust pipe 5. In this case, the urea aqueous solution is supplied to the main stream portion of the exhaust pipe 5 through a branch pipe.

The injection valve 25 is held in a cooling housing, which is not illustrated, and to which a coolant for the internal combustion engine 1 can be delivered, for example. During operation of the internal combustion engine 1, the coolant flows through the cooling housing to cool the injection valve 25. Meanwhile, when the internal combustion engine 1 is stopped, delivery of the coolant is also stopped.

As the pump 21, a motorized diaphragm pump or a motorized pump is used, for example. The controller 100 controls the output of the pump 21 such that the pressure in the second supply passage 33, that is, a pressure of the urea aqueous solution to be supplied to the injection valve 25 is maintained at the specified target value. For example, the controller 100 executes feedback control on the output of the pump 21 on the basis of a difference between the pressure that is detected by a pressure sensor provided in the second supply passage 33 and the target value.

The pump unit 20 includes the channel selector valve 23 that is used to switch a flow direction of the urea aqueous solution pressure-fed by the pump 21. The channel selector valve 23 is configured by using an electromagnetic valve, for example, and is driven by the controller 100. In this embodiment, the channel selector valve 23 switches a state between a first state where a suction side of the pump 21 and the first supply passage 31 as well as a discharge side of the pump 21 and the second supply passage 33 are connected and a second state where the discharge side of the pump 21 and the first supply passage 31 as well as the suction side of the pump 21 and the second supply passage 33 are connected.

In the case where injection control of the urea aqueous solution into the exhaust pipe 5 is executed, the channel selector valve 23 is held in the first state such that the urea aqueous solution flows from the storage tank 11 side to the injection valve 25 side. Meanwhile, in the case where the urea aqueous solution in the reducing agent supplier 10 is collected in the storage tank 11, the channel selector valve 23 is held in the second state such that the urea aqueous solution flows from the injection valve 25 side to the storage tank 11 side.

For example, in the case where the channel selector valve 23 is brought into the first state in an energized state and is brought into the second state in an unenergized state, the channel selector valve 23 is maintained in the unenergized state during the injection control of the urea aqueous solution, and the controller 100 brings the channel selector valve 23 into the energized state during collection of the urea aqueous solution. Note that, instead of using the channel selector valve 23, a bidirectionally rotatable pump may be used so as to be able to collect the urea aqueous solution.

For example, the controller 100 may partially or entirely constructed of the microcomputer, a microprocessor unit, or the like. In addition, the controller 100 may partially or entirely be constructed of a member in which firmware or the like can be updated, or may partially or entirely be a program module or the like that is executed by a command from a CPU or the like.

The controller 100 includes plural drive circuits that respectively drive the pump 21, the channel selector valve 23, and the injection valve 25. Each of the drive circuits is operated on the basis of a signal sent from the microcomputer or the like, so as to drive corresponding one of the pump 21, the channel selector valve 23, and the injection valve 25.

3. Heating System

Next, a description will be made on a configuration example of a heating system in the reducing agent supplier 10. In the reducing agent supplier 10, a coolant circulation passage 50 through which the coolant for the internal combustion engine 1 circulates is disposed. The internal combustion engine 1 includes a coolant circuit 4 that is formed in an engine block and causes the coolant to circulate in a manner to flow through a radiator 3. The coolant circuit 4 includes a pump 2 that causes the circulation of the coolant. The coolant circulation passage 50 is branched from the coolant circuit 4 in a branch portion 55 that is provided in a portion of the coolant circuit 4 on a downstream side of the pump 2, and merges with the coolant circuit 4 in a merging portion 57 that is provided in a portion of the coolant circuit 4 on an upstream side of the pump 2.

The coolant circulation passage 50 includes: a first portion 50*a*; a second portion 50*b* and a third portion 50*c*, each of which is branched from the first portion 50*a*; and a fourth portion 50*d* in which the second portion 50*b* and the third portion 50*c* merge with each other. The third portion 50*c* passes through the cooling housing, which is not illustrated and holds the injection valve 25. The coolant that flows through the third portion 50*c* has a function of mainly cooling the injection valve 25.

The second portion 50*b* passes through the storage tank 11 and the pump unit 20. The second portion 50*b* passes through the storage tank 11 and is disposed adjacent to the first supply passage 31, the channel selector valve 23, the pump 21, and the second supply passage 33. The coolant that flows through the second portion 50*b* has a function of mainly heating the reducing agent supplier 10 and defrost the urea aqueous solution.

An on-off control valve 61 is provided in the middle of the second portion 50*b*. The on-off control valve 61 is an electromagnetic on-off valve, for example, is subjected to drive control by the controller 100, and opens/closes the second portion 50*b*. The on-off control valve 61 is a valve of a normally closed type that is driven with supplied power from an on-board power supply. In the case where the internal combustion engine 1 is started and thereafter the urea aqueous solution is possibly frozen in the reducing agent supplier 10, the controller 100 energizes the on-off control valve 61 to maintain the on-off control valve 61 in an open state. In this way, the coolant that circulates in the coolant circuit 4 of the internal combustion engine 1 partially flows through the coolant circulation passage 50 and heats the reducing agent supplier 10. Meanwhile, in the case where there is no possibility that the urea aqueous solution is frozen in the reducing agent supplier 10, the controller 100 stops energizing the on-off control valve 61 and maintains the on-off control valve 61 in a closed state.

Here, an on-off control valve is not provided in the third portion 50*c* of the coolant circulation passage 50. Thus, while the pump 2 in the internal combustion engine 1 is driven, the coolant constantly flows through the third portion 50*c* and cools the injection valve 25.

The second portion 50*b* of the coolant circulation passage 50 includes a bypass passage 50*ba* that connects an upstream side and a downstream side of the on-off control valve 61. The bypass passage 50*ba* includes an on-off valve 63 that opens/closes the bypass passage 50*ba*. In this embodiment, the on-off valve 63 is a valve that is not subjected to drive control by the controller 100 and is opened/closed by a force other than the supplied power from the on-board power supply. Opening and closing of the on-off valve 63 is manually switched, for example. The on-off valve 63 is opened in at least a partial period of a heating period by a block heater 40 so as to cause the coolant to circulate in the coolant circulation passage 50.

The internal combustion engine 1 includes the block heater 40 that can heat the coolant circulating in the coolant circuit 4. The block heater 40 is attached to a housing that is formed with the coolant circuit 4, for example. The block heater 40 includes an electrical connector 41, and an electrical connector 91 of an external power supply device 90 can be connected thereto. That is, the block heater 40 is actuated with external power and thereby heats the coolant.

4. Operation of Heating System

Figure 2:
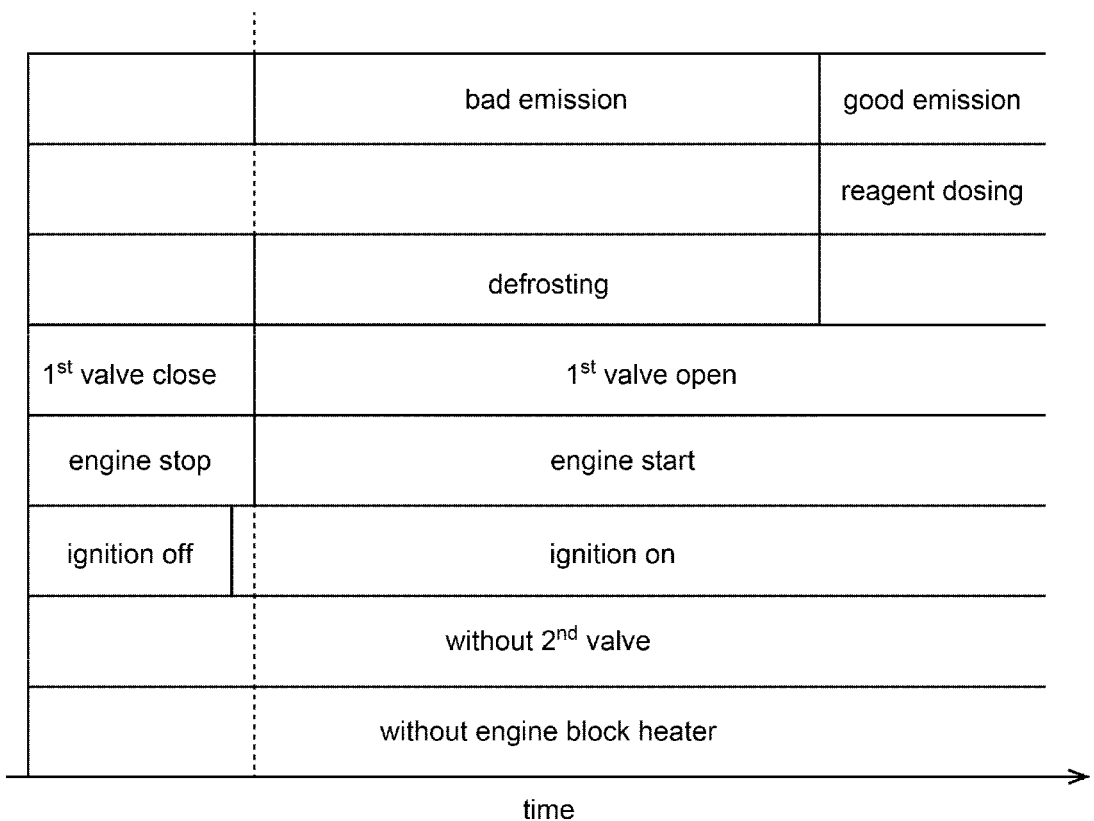
FIG. 2 is an explanatory chart illustrating an operation example in a reference example.
Figure 3:
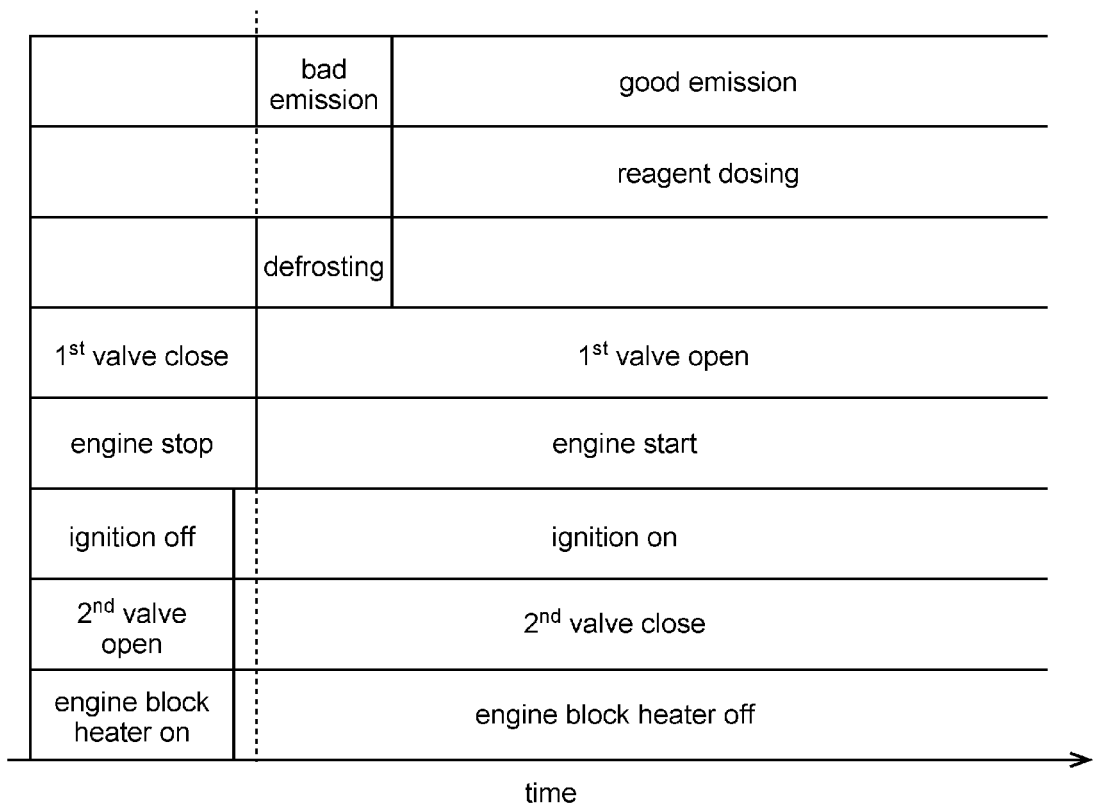
FIG. 3 is an explanatory chart illustrating an operation example in this embodiment.

The description has been made so far on the configuration examples of the reducing agent supplier 10 and the heating system. A description will hereinafter be made on an example of operation of the heating system. FIG. 2 and FIG. 3 are explanatory charts, each of which illustrates the operation of the internal combustion engine 1, the reducing agent supplier 10, and the heating system. Each of FIG. 2 and FIG. 3 illustrates states of exhaust emission, the injection control of the urea aqueous solution, defrosting control, the on-off control valve (represented as a "$1^{st}$ valve" in the drawings) 61, the internal combustion engine 1, an ignition switch, the on-off valve (represented as a "$2^{nd}$ valve" in the drawings) 63, and the block heater 40 from above.

4-1. Reference Example

First, a description will be made on operation in a reference example in which the bypass passage 50*ba* of the coolant circulation passage 50, the on-off valve 63, and the block heater 40 are not provided.

FIG. 2 is the explanatory chart illustrating the operation in the reference example. In the reference example, means for heating the reducing agent supplier 10 in a period until the ignition switch of the internal combustion engine 1 is turned on and the internal combustion engine 1 is started. Thus, the coolant does not circulate in the coolant circulation passage 50, and the defrosting control of the urea aqueous solution is not executed. When the ignition switch of the internal combustion engine 1 is turned on, the internal combustion engine 1 is started, and the on-off control valve 61, which is provided in the second portion 50*b* of the coolant circulation passage 50, is brought into the open state. In this way, the coolant, which is pressure-fed by the pump 2, starts circulating in the coolant circuit 4 of the internal combustion engine 1 and the coolant circulation passage 50, and the defrosting control of the urea aqueous solution is thereby started.

In a period until the defrosting control of the urea aqueous solution is terminated and the injection of the urea aqueous solution is started, NOx purification efficiency of the urea SCR system remains low, and the urea SCR system is not brought into a state capable of reducing NOx in the exhaust emission. When the defrosting control of the urea aqueous solution is terminated, the injection control of the urea aqueous solution is permitted, and the reducing agent supplier 10 starts being filled with the urea aqueous solution. For example, the defrosting control of the urea aqueous solution is terminated when a detected temperature by the temperature sensor 15, which is provided in the storage tank 11, exceeds a reference value, which is set in advance. Thereafter, the injection control of the urea aqueous solution is executed. As a result, NOx is purified by the urea SCR system, and the urea SCR system is brought into the state capable of reducing NOx in the exhaust emission.

In the reference example illustrated in FIG. 2, the period from a time point at which the internal combustion engine 1 is started to a time point at which the defrosting control of the urea aqueous solution is terminated and the injection of the urea aqueous solution is started is relatively long.

4-2. Example of This Embodiment

FIG. 3 is an explanatory chart illustrating the operation in the case where the heating system according to this embodiment is applied. In the example of this embodiment, even in an off state of the ignition switch of the internal combustion engine 1, the coolant for the internal combustion engine 1 is heated by supplying the external power to the block heater 40. Accordingly, the coolant starts circulating in the coolant circuit 4 of the internal combustion engine 1 due to convection occurred by a temperature increase in the coolant. In this state, the on-off valve 63, which is provided in the bypass passage 50*ba* of the coolant circulation passage 50, is manually brought into the open state. As a result, the coolant can circulate in the coolant circulation passage 50 through the bypass passage 50*ba*. In the meantime, a vehicle control system does not have to be activated. That is, the power does not have to be supplied to the reducing agent supplier 10 and the controller 100.

Then, heating by the block heater 40 is stopped, and the on-off valve 63 is brought into the closed state. Meanwhile, the ignition switch of the internal combustion engine 1 is turned on, the internal combustion engine 1 is started, and the on-off control valve 61, which is provided in the second portion 50*b* of the coolant circulation passage 50, is brought into the open state. In this way, the coolant, which is pressure-fed by the pump 2, circulates in the coolant circuit 4 of the internal combustion engine 1 and the coolant circulation passage 50, and the defrosting control of the urea aqueous solution continues.

In the operation example illustrated in FIG. 3, even in the case where the urea aqueous solution is not completely defrosted at the start of the internal combustion engine 1, an execution period in which the defrosting control of the urea aqueous solution is executed after the start of the internal combustion engine 1 is shortened. For example, in the case where the temperature of the urea aqueous solution in the storage tank 11 exceeds a reference temperature, at which the defrosting control of the urea aqueous solution is terminated, before the start of the internal combustion engine 1, the reducing agent supplier 10 is promptly filled with the urea aqueous solution after the start of the internal combustion engine 1. Accordingly, the injection control of the urea aqueous solution is executed shortly after the start of the internal combustion engine 1. As a result, the urea SCR system is brought into the state capable of reducing NOx in the exhaust emission.

5. Application Example

The description has been made so far on the basic configuration example of the heating system according to this embodiment. However, various modifications can be made to the heating system. A description will hereinafter be made on an application example of the heating system according to this embodiment.

A period in which the coolant is heated by using the block heater 40 before the start of the internal combustion engine 1 may be set to an arbitrary period by a user. However, the heating system may include a notification device that notifies the user or the like of a lapse of the heating period by the block heater 40.

For example, the notification device may notify that the temperature of the coolant for the internal combustion engine 1 or a temperature of the housing, which is formed with the coolant circuit 4, has reached a reference temperature after the external power starts being supplied to the block heater 40. For example, a temperature sensor may integrally be provided in the block heater 40, so as to be able to detect the temperature of the coolant for the internal combustion engine 1 or the temperature of the housing, which is formed with the coolant circuit 4.

In this case, for example, the external power supply device 90 may have a function as the notification device. In the case where the detected temperature exceeds the reference temperature, which is set in advance, after the start of the power supply to the block heater 40, the external power supply device 90 may perform at least one type of operation such as producing notification sound or lighting a notification lamp. In this way, the user can recognize that defrosting of the urea aqueous solution in the reducing agent supplier 10 progresses, and thus can start using the vehicle. The notification device may perform the operation such as producing the notification sound or lighting the notification lamp in the case where a specified period elapses after the detected temperature exceeds the reference temperature.

As it has been described so far, the heating system for the reducing agent supplier 10 according to this embodiment includes the block heater 40 that heats the coolant for the internal combustion engine 1 by using the external power before the activation of the vehicle control system and before the start of the internal combustion engine 1. In addition, the heating system for the reducing agent supplier 10 includes the bypass passage 50*ba*, which connects the upstream side and the downstream side of the on-off control valve 61, and the on-off valve 63, which is provided in the bypass passage 50*ba*, so that the coolant can circulate in the coolant circulation passage 50 even before the activation of the vehicle control system.

Accordingly, the vehicle user can heat the reducing agent supplier 10 by increasing the temperature of the coolant for the internal combustion engine 1 and causing the coolant to circulate in the coolant circulation passage 50 before the start of the internal combustion engine 1. As a result, after the start of the internal combustion engine 1, it is possible to significantly shorten the period until the defrosting control of the urea aqueous solution is completed and the injection control of the urea aqueous solution is started by the reducing agent supplier 10. Therefore, the urea SCR system is brought into the state capable of promptly reducing NOx in the exhaust emission.

The preferred embodiment of the present invention has been described in detail so far with reference to the accompanying drawings. However, the present invention is not limited to such an embodiment. It is obvious that a person who has basic knowledge in the technical field to which the present invention pertains could have easily arrived at various modification examples and application examples that fall within the scope of the technical idea described in the claims. It is understood that those naturally fall within the technical scope of the present invention.

For example, in the above embodiment, the coolant circulates in the coolant circuit 4 and the coolant circulation passage 50 due to the convection of the coolant whose temperature is increased by the supply of the external power to the block heater 40. However, the present invention is not limited to such an embodiment. For example, the supply of the external power to the pump 2, which pressure-feeds the coolant for the internal combustion engine 1, may be allowed, and the block heater 40 and the pump 2 may be energized to circulate the coolant. In this way, coolant circulation efficiency in the coolant circulation passage 50 is improved, and defrosting of the urea aqueous solution is promoted.

In addition, in the above embodiment, the notification device performs the at least one type of the operation such as producing the notification sound or lighting the notification lamp on the basis of the temperature of the coolant or the temperature of the housing. However, the present invention is not limited to such an embodiment. For example, the notification device may be configured to be able to obtain a signal of the temperature sensor 15, which is provided in the storage tank 11, even before the activation of the vehicle control system, and may produce the notification sound, light the notification lamp, or the like when the temperature in the storage tank 11 reaches the reference temperature.

Furthermore, in the above embodiment, the on-off valve 63, which is opened before the start of the internal combustion engine 1, is the manual valve. However, the present invention is not limited to such an embodiment. For example, the on-off valve 63 may be a valve that can be opened with a supply of the external power even before the activation of the vehicle control system.

What is claimed is:

1. A heating system that heats a reducing agent supplier (10) for supplying a urea aqueous solution to an exhaust passage (5) of an internal combustion engine (1) in a vehicle, the reducing agent supplier (10) including a storage tank (11), a pump unit (20), and an injection valve (25), the heating system comprising:
   a block heater (40) that is provided in a housing formed with a coolant circuit (4) of the internal combustion engine (1) and is configured to be supplied with power of an external power supply (90);
   a coolant circulation passage (50) that is branched from the coolant circuit (4), is disposed in at least a part of the reducing agent supplier (10), and merges with the coolant circuit (4) again;
   an on-off control valve (61) that is provided in the middle of the coolant circulation passage (50);
   a bypass passage (50ba) that connects an upstream side and a downstream side of the on-off control valve (61); and
   an on-off valve (63) that is provided in the bypass passage (50ba);
   wherein the on-off control valve (61) is a valve that is driven with supplied power from an on-board power supply, and the on-off valve (63) is a valve that is opened/closed by a force other than the supplied power from the on-board power supply.

2. The heating system according to claim 1, wherein the on-off valve (63) is a manual on-off valve.

3. The heating system according to claim 1 further comprising:
   a temperature sensor that detects a coolant temperature in the coolant circuit (4) or a temperature of the housing, or a temperature sensor (15) that detects a temperature of the storage tank (11) accommodating the urea aqueous solution.

4. The heating system according to claim 1, wherein the on-off valve (63) is opened in at least a partial period of a heating period by the block heater (40).

5. The heating system according to claim 2 further comprising:
   a temperature sensor that detects a coolant temperature in the coolant circuit (4) or a temperature of the housing, or a temperature sensor (15) that detects a temperature of the storage tank (11) accommodating the urea aqueous solution.

6. The heating system according to claim 5, wherein the on-off valve (63) is opened in at least a partial period of a heating period by the block heater (40).

* * * * *